C. Bates.
Revolving Harrow.
No. 90,628. Patented Jun. 1, 1869.
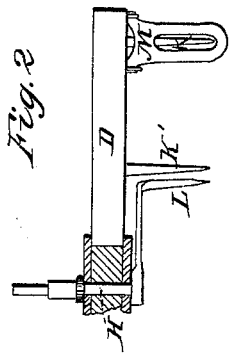
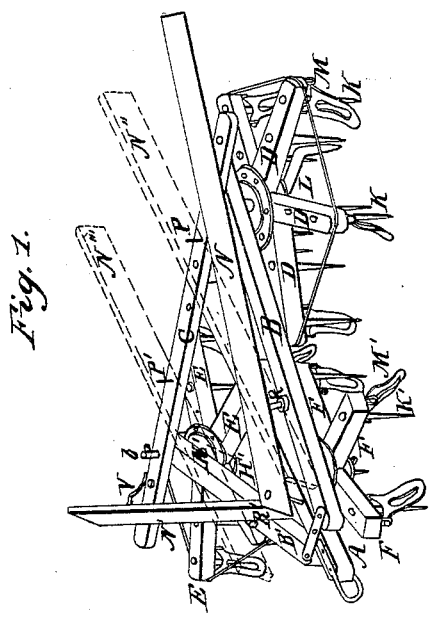
Witnesses.
Frank G. Parker.
A. Hen Berry.
Inventor.
Caleb Bates.

United States Patent Office.

CALEB BATES, OF KINGSTON, MASSACHUSETTS.

*Letters Patent No. 90,628, dated June 1, 1869.*

IMPROVEMENT IN REVOLVING HARROW.

The Schedule referred to in these Letters Patent and making part of the same.

*To all whom it may concern:*

Be it known that I, CALEB BATES, of Kingston, in the county of Plymouth, and State of Massachusetts, have invented certain new and useful Improvements in Revolving Harrows; and I do hereby declare that the following is a full and exact description thereof, reference being had to the accompanying drawings, and to the letters of reference marked thereon.

To enable others skilled in the art to make and use my invention, I will proceed to describe its nature, construction, and use.

The nature of my invention consists—

First, in combining, with the tooth of a harrow, a paddle, which is so constructed, that while it serves to cause the harrows to revolve, it also serves to clear the tooth of any accumulation of earth, weeds, &c.

Second, in combining, with the axle upon which the harrow revolves, a bent knife, which extends radially nearly to the first tooth, then bends and extends downward, parallel with the tooth, thus serving to clear the inner row of teeth from earth, &c., that may have gathered.

Third, in so combining and arranging with the frame of a harrow, two bars, so connected, that when fixed in one position, the harrow being turned upside down, they will serve as a V-shaped scraper, or leveller, but, by being placed in another position, they serve as runners, for the purpose of more easily transporting the harrow.

Drawings.

Figure 1 is a perspective view.
Figure 2 is a section of parts.

I construct my harrow as follows:

A is the centre, or draught-bar, to which is directly attached one, F F F, of the revolving harrows.

B and B' are side-bars, hinged, at their front end, to the draught-bar A, and confined to the rear cross-bar C, by pins, one of which, $b$, is shown in fig. 1.

This cross-bar C is provided with a series of holes, into any of which the pins $b$ may enter, so that the side-bars B B' may be adjusted so as to give different widths to the harrow.

The three secondary revolving harrows, F F, &c., D D, &c., and E E, &c., are each attached to the framework by an axle, H, said axle being rigidly attached to the frame, so as not to revolve.

To each of these axles a bent knife, L, is attached, as shown in fig. 2. This knife being stationary, and arranged as shown, serves to clear the inner row of teeth as they pass it.

The paddle M is so hung, that, in one part of the revolution of the harrow, it will serve as a buttress, and thus offer sufficient resistance to cause the harrow to revolve always in one direction, since this paddle will offer no resistance in that part of the revolution of the harrow, in which it is behind the tooth.

This action of the paddle is more fully described in patent granted to me, March 26, 1867.

The improvement which I have made in this paddle consists in its form, and in providing it with a slot, as shown, so that at each half revolution of the harrow, it is thrown back so far, that the edges of the slot pass the tooth, and, together with the tooth, form shears, and thus cut and remove the accumulations.

As this motion is limited, the paddle will still perform its function as a buttress.

N and N' are two long bars, or planks, connected, near their front end, to the frame, by toggle-pivots R R', while the rear end is confined by suitable stops V, and by hooks, or any convenient device.

When these bars N N' are fastened in the position represented in fig. 1, and the harrow is turned upside down, they together form a V-shaped scraper, or leveller; but when the bars are brought parallel to each other, as represented by the dotted lines N'' N''', and fixed by pins P P', then they form runners, upon which the harrow may be transported from place to place.

What I claim as my invention, and desire to secure by Letters Patent, is—

1. The paddle M, in combination with the tooth K, working, as described, and for the purpose set forth.

2. The bent knife L, in combination with the axle H and tooth K', as described, and for the purpose set forth.

3. In combination with the harrow, the bars N N', when arranged to operate substantially as described, and for the purpose set forth.

CALEB BATES.

Witnesses:
FRANK G. PARKER,
A. HUN BERRY.